Feb. 28, 1933.    R. STIX    1,899,778

REGENERATIVE BRAKING OF SINGLE PHASE COMMUTATOR MOTORS

Filed Aug. 21, 1929

INVENTOR
Robert Stix
BY
ATTORNEY

Patented Feb. 28, 1933

1,899,778

UNITED STATES PATENT OFFICE

ROBERT STIX, OF VIENNA, AUSTRIA, ASSIGNOR TO WESTINGHOUSE ELECTRIC & MANUFACTURING COMPANY, A CORPORATION OF PENNSYLVANIA

REGENERATIVE BRAKING OF SINGLE PHASE COMMUTATOR MOTORS

Application filed August 21, 1929, Serial No. 387,305, and in Austria August 22, 1928.

This invention relates generally to braking systems, and more particularly to regenerative braking systems for vehicle propelling motors.

In the operation of regenerative braking systems for single phase alternating current motors, or electrically driven vehicles using single phase motors, it has not been possible heretofore to obtain a return of the regenerated current to the power source at unity power factor, except at pre-determined speeds or braking efforts. Therefore, the trolley conductor is subjected to a high wattless current. Further, under such operating conditions, because of the phase displacement of the regenerated current relative to the line current, the motors are excessively heated and commutation is unsatisfactory.

The object of the present invention is to provide for the recovery of the energy expended in the braking of an electric locomotive or other electrically driven vehicle and the return of the regenerated current to the power source at substantially unity power factor, over a wide range of motor speeds.

Other objects of the invention will, in part, be obvious, and in part appear hereinafter.

The invention accordingly is disclosed in the embodiment thereof shown in the accompanying drawing, and comprises the combination of elements and arrangements of parts, that will be exemplified in the system hereinafter set forth and the scope of the application of which, will be indicated in the claims.

Figure 1:
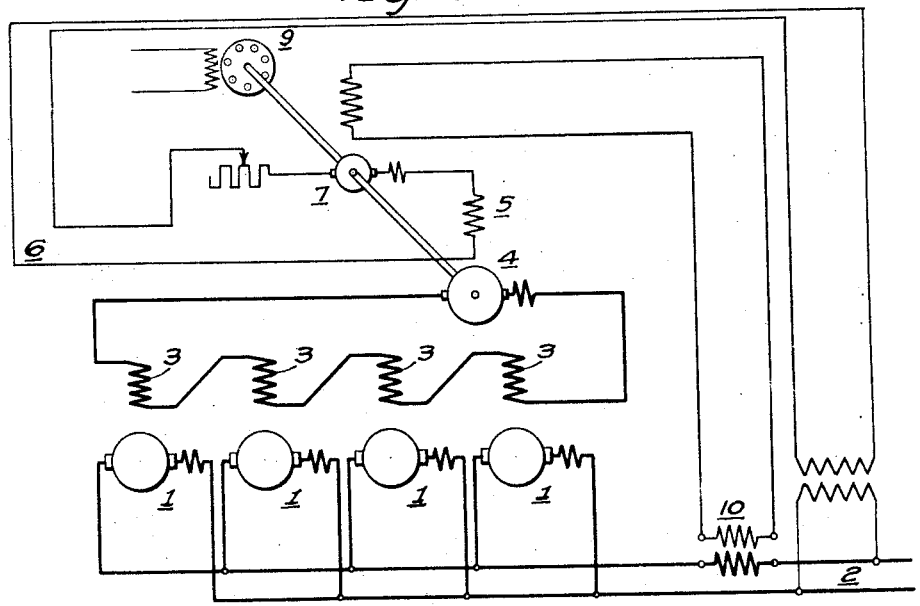
Figure 2:
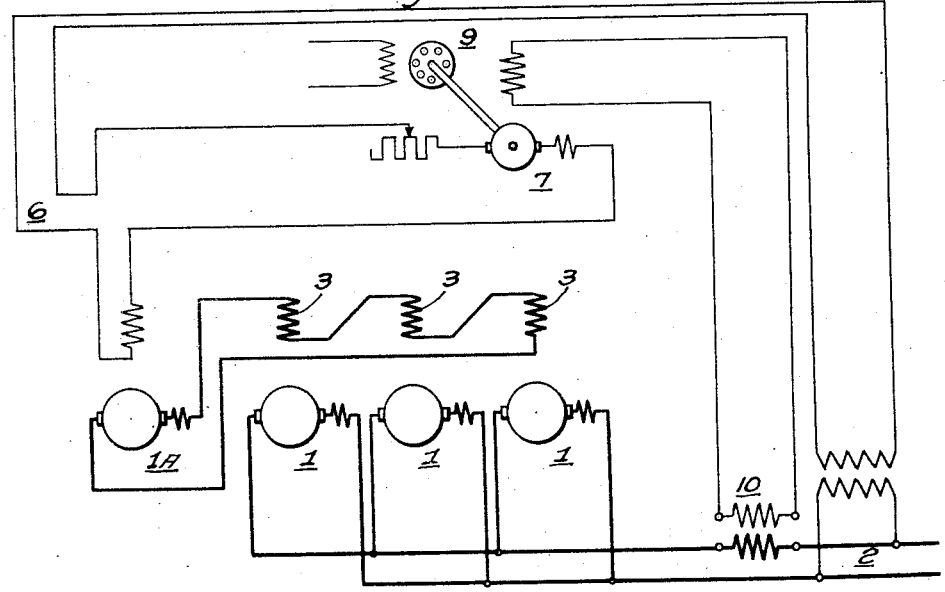

For a fuller understanding of the nature and objects of the invention, reference should be had to the following detailed description taken in connection with the accompanying drawing in which, Figure 1 is a diagrammatic view of a regenerative system arranged in accordance with the present invention, and Fig. 2 is a diagrammatic view of a modified form of the regenerative system shown in Fig. 1.

Referring now to the drawing and Fig. 1 in particular, a plurality of driving motors designated generally by the numeral 1 are shown connected across a network or a source of power 2. It will be readily understood, that when the motors 1 are driven by the momentum of a vehicle that the current generated will be returned to the network 2.

In this particular instance the field windings 3 of the motors 1 are connected in series circuit relation and across the armature of an exciter generator 4, which in this particular instance is an alternating-current commutator generator of any well known type. The field winding 5 of the exciter 4 is connected to the network 2 in any suitable manner.

In this particular instance in the interest of simplicity in the drawing, the field winding 5 is shown connected to a source of power 6. It will be readily understood that the source of power 6 may be the secondary of a transformer, which has its primary winding connected across the source of power or network 2.

An auxiliary exciter-generator 7 is connected in series circuit relation with the field winding 5 of the exciter-generator 4. The exciter-generators 4 and 7 are disposed on the same shaft and are driven by a substantially constant speed motor 9.

In order to provide for the recovery of the energy expended in the braking operation and the return of it in the form of regenerated current of unity power factor to the network 2, provision is made for exciting the exciter-generator 7 from a current transformer 10 connected in the network 2.

In the operation of the system, the voltage developed by the exciter generator 7 causes a current to flow in the energizing circuit of the field winding 5 of the exciter generator 4, which is in opposition to a component which is similar in phase and dependent upon the current flowing in the network 2. Therefore, the characteristic of the regenerated current is made to depend upon the exciter generators 4 and 7. By carefully designing the generator 7 and adjusting the circuits to give the desired additional exciter voltage, it is possible to control the power factor of the regenerated current.

If the proper attention is given to the design of the exciter 7, smooth operation of the system may be obtained.

The design of the exciter generator 7 will govern the current impulses during the transition from one braking step to the next. It has been found that by properly designing the exciter generator 7, it is possible to operate on each step in the whole braking range in such a manner that the regenerated current will be delivered to the network at unity power factor.

In the modified form of the invention illustrated in Fig. 2, one of the motors 1 is connected to function as an exciter for the other motors. The motor which is connected to function as an exciter-generator is substituted for the exciter generator 4 of the system disclosed in Fig. 1. The excitation of the field winding of the motor which is connected to operate as an exciter generator and which we shall designate as 1—A, is made to depend upon the current flowing in the network 2.

As illustrated, the field winding of the motor 1—A is connected across the source of power 6 and in series circuit relation with the auxiliary exciter generator 7. The field winding of the exciter generator 7 is connected across the secondary of the current transformer 10, as in the system disclosed in Fig. 1. The functioning of the system illustrated in Fig. 2 is similar to that disclosed in Fig. 1.

Since various changes may be made in the above-described construction and arrangement of parts and different embodiments of the invention may be made without departing from the scope thereof, it is intended that all matter contained in the above description or shown in the accompanying drawing shall be interpreted as illustrative and not in a limiting sense.

I claim as my invention:

1. In a regenerative braking system, in combination, a single phase commutator motor, a single phase source of power for the motor, a constant speed exciter-generator for exciting the motor, and independent of the motor speed means for differentially exciting the exciter-generator responsive to the single phase current flowing in the power source and to the voltage of the power source to cause a current component in the exciter generator excitation circuit proportional to and in opposition to the regenerated current, thereby to provide for the delivery of a current at the power source having a desired power factor.

2. In a regenerative braking system, in combination, a single phase commutator motor having a separately excited field winding, a single phase source of power for the motor, an exciter-generator connected in series-circuit relation with the field winding of the motor for exciting the motor, said exciter-generator being provided with a field winding connected to the source of power, an auxiliary exciter-generator connected in series-circuit relation with the field winding of the exciter-generator, means for driving the exciter-generator and the auxiliary exciter-generator at a predetermined speed, said auxiliary generator being provided with a field winding and means for exciting said auxiliary-exciter-generator field winding in accordance with the regenerated current flowing in the motor, thereby to provide for the delivery of a regenerated current to the power source, said regenerated current having substantially unity power factor.

3. In a regenerative braking system, in combination, a single-phase commutator motor having a separately excited field winding, a single-phase source of power for the motor, an exciter generator for exciting the separately excited field winding of the motor, said exciter generator being connected in series-circuit relation with the field winding of the motor, a separately excited field winding for the exciter-generator connected to the power source, an auxiliary exciter-generator connected in series-circuit relation with the separately excited winding of the exciter-generator, means for driving the exciter-generator and the auxiliary exciter-generator at a predetermined speed, a separately excited field winding for the auxiliary exciter-generator, and means for exciting said auxiliary-exciter-generator field winding in accordance with the regenerated current flowing in the motor, whereby the excitation of the exciter-generator may be varied in accordance with the regenerated current to provide for delivering a current to the power source having substantially unity power factor.

4. In a regenerative braking system, in combination, a single phase commutator motor having a separately-excited field winding, a single phase source of power for the motor, an exciter-generator connected in series-circuit relation with the field winding of the motor for exciting the motor, said exciter-generator being provided with a field winding connected across the source of power, and a constant speed auxiliary generator connected in series-circuit relation with the field winding of the exciter-generator, said auxiliary generator having a field winding energized in accordance with the regenerated current flowing in the motor, whereby the current flowing in the excitation circuit of the exciter-generator is varied in accordance with the regenerated current to provide for delivering a current to the power source having substantially unity power factor.

In testimony whereof, I have hereunto subscribed my name this 30th day of July, 1929, at Vienna, Austria.

ROBERT STIX.